(12) United States Patent
Dollard

(10) Patent No.: US 8,352,546 B1
(45) Date of Patent: Jan. 8, 2013

(54) CONTEXTUAL AND LOCATION AWARENESS FOR DEVICE INTERACTION

(75) Inventor: Morgan Francois Stephan Dollard, Belmont, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/314,668

(22) Filed: Dec. 8, 2011

(51) Int. Cl.
*G06F 15/16* (2006.01)

(52) U.S. Cl. ......... 709/203; 709/206; 709/217; 709/223

(58) Field of Classification Search ............... 709/203, 709/206, 217, 219, 223, 224
See application file for complete search history.

(56) References Cited

U.S. PATENT DOCUMENTS

| | | | | |
|---|---|---|---|---|
| 5,493,692 | A * | 2/1996 | Theimer et al. | 455/26.1 |
| 5,978,673 | A | 11/1999 | Alperovich et al. | |
| 6,091,948 | A | 7/2000 | Carr et al. | |
| 7,808,980 | B2 | 10/2010 | Skakkebaek et al. | |
| 7,907,903 | B2 | 3/2011 | Shen | |
| 2003/0023690 | A1 * | 1/2003 | Lohtia | 709/206 |
| 2003/0131069 | A1 * | 7/2003 | Lucovsky et al. | 709/217 |
| 2004/0225654 | A1 * | 11/2004 | Banavar et al. | 707/6 |
| 2006/0010206 | A1 * | 1/2006 | Apacible et al. | 709/205 |
| 2007/0214228 | A1 * | 9/2007 | Horvitz et al. | 709/207 |
| 2008/0153480 | A1 | 6/2008 | Jiang | |
| 2009/0005070 | A1 | 1/2009 | Forstall et al. | |
| 2009/0082001 | A1 | 3/2009 | Rahul et al. | |
| 2010/0128857 | A1 | 5/2010 | Logan | |
| 2010/0130228 | A1 | 5/2010 | Vendrow et al. | |
| 2010/0279673 | A1 | 11/2010 | Sharp et al. | |
| 2011/0112768 | A1 | 5/2011 | Doyle | |
| 2011/0209221 | A1 | 8/2011 | Hanson et al. | |
| 2012/0019365 | A1 * | 1/2012 | Tuikka et al. | 340/10.1 |

OTHER PUBLICATIONS

Non-Final US Office Action dated Mar. 8, 2012 for U.S. Appl. No. 13/314,602, 25 pages.

* cited by examiner

*Primary Examiner* — LaShonda Jacobs
(74) *Attorney, Agent, or Firm* — Harness, Dickey & Pierce, P.L.C.

(57) ABSTRACT

A computer-implemented method is provided for notifying a user having an association with a plurality of computing devices. A notification service is configured to receive notifications intended for the user and forward the notifications to one or more of the computing devices associated with the user. The notification service may determine a present location of the user and select a computing device to send the notification in accordance with the present location of the user. The notification service may also identify one of the computing devices that is currently being interacted with by the user from amongst the computing devices associated with the user and send the notification to the identified computing device.

18 Claims, 4 Drawing Sheets

CONTEXTUAL AND LOCATION AWARENESS FOR DEVICE INTERACTION

BACKGROUND

Today, many computing devices operate with little to no contextual awareness of other computing devices. For example, a user with a mobile phone may arrive at a workplace and begins interacting with a desktop computer. While at the workplace, important notifications may be sent to the user's mobile phone, the desktop computer or both. While the user is interacting with the desktop computer at the workplace, notifications sent to the mobile phone may go unnoticed or be viewed by the user in an untimely manner. Conversely, when the user leaves the workplace, notifications sent to the user's desktop computer may go unnoticed or be viewed in an untimely manner. In another example, the user arrives at home. While at home, incoming phone calls may be routed to either the mobile phone or the user's home phone. Coordination amongst the user's devices can be handled more efficiently when the devices are contextually aware of the presence of one another and of which device currently has the user's attention.

Therefore, it is desirable to provide a notification service for users having an association with a plurality of computing devices. This section provides background information related to the present disclosure which is not necessarily prior art.

SUMMARY

A computer-implemented method is provided for notifying a user having an association with a plurality of computing devices. A notification service can reside on a server computer located remote from the user. The notification service can be configured to receive notifications intended for the user and forward the notifications to one or more of the computing devices associated with the user.

In one aspect of this disclosure, the notification service can identify one of the computing devices that is being interacted with by the user from amongst the computing devices associated with the user and send the notification to the identified computing device.

In another aspect of this disclosure, the notification service may determine a present location of the user and select a computing device to send the notification in accordance with the present location of the user. From amongst two or more computing devices at the present location, the notification service may also identify a computing device that has is being interacted with by the user and send the notification to the identified computing device.

This section provides a general summary of the disclosure, and is not a comprehensive disclosure of its full scope or all of its features. Further areas of applicability will become apparent from the description provided herein. The description and specific examples in this summary are intended for purposes of illustration only and are not intended to limit the scope of the present disclosure.

DRAWINGS

Figure 1:
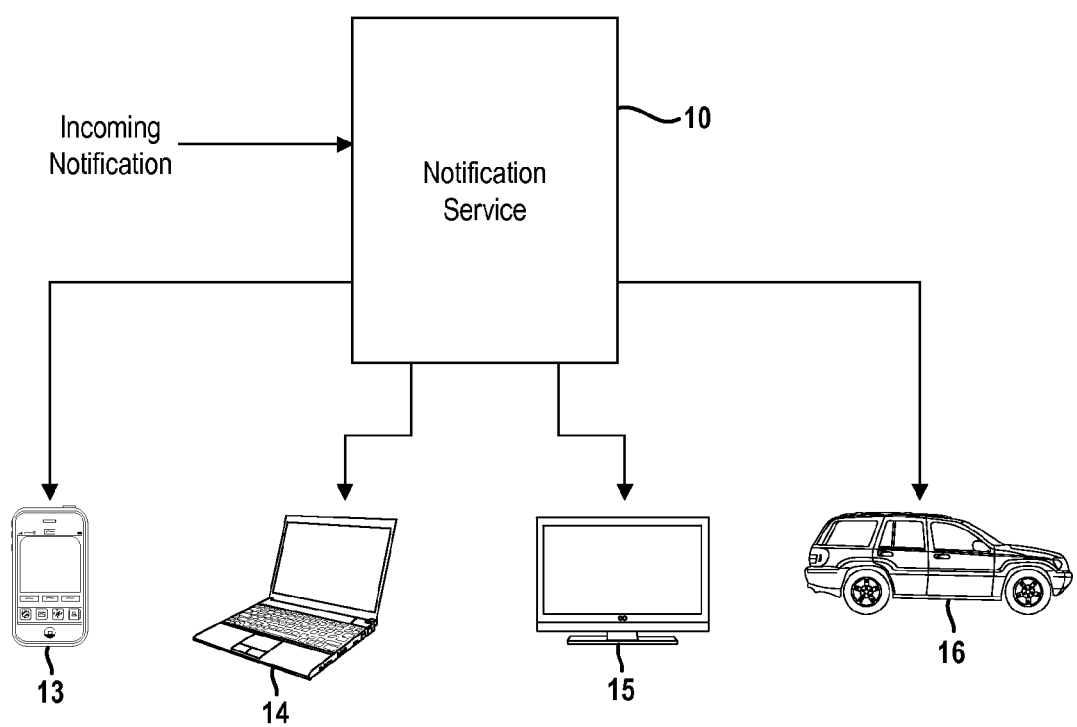
FIG. 1 is a diagram of a notification service for users having an association with a plurality of computing devices.

The drawings described herein are for illustrative purposes only of selected embodiments and not all possible implementations, and are not intended to limit the scope of the present disclosure. Corresponding reference numerals indicate corresponding parts throughout the several views of the drawings.

DETAILED DESCRIPTION

FIG. 1 provides an overview of a notification service 10 for notifying a user having an association with a plurality of computing devices. The notification service 10 can operate generally to receive notifications intended for the user and forwards the notifications to one or more of a plurality of computing devices associated with the user. For illustration purposes, the notification service 10 is shown interacting with a mobile phone 13, a laptop computer 14, a television 15 and a navigation system in a vehicle 16. Other types of computing devices are contemplated by this disclosure including but not limited to a desktop computer, a digital camera, a medical device, a video game console, etc.

In one example embodiment, the notification service 10 can be integrated into a mail server. In an example scenario, the notification service 10 can direct notifications primarily to a user's mobile phone. Upon arriving at their office, the user can begin interacting with a desktop computer. While seated at their desk, the notification service 10 can direct notifications for the user to the desktop computer. Determining which device to direct notifications may be based upon the current location of the user as well as which device has the attention of the user as will be further described below. Once the user leaves their office, the notification service 10 can continue directing notifications to the user's mobile phone. While reference is made to routing email messages, the notification service can be extended to other types of notifications including but not limited to text messaging, routing of incoming phone calls, application specific messaging (social networking updates) and system messages from one of the user's associated devices (e.g., a system update is available or a low battery indicator for a phone).

Figure 2:
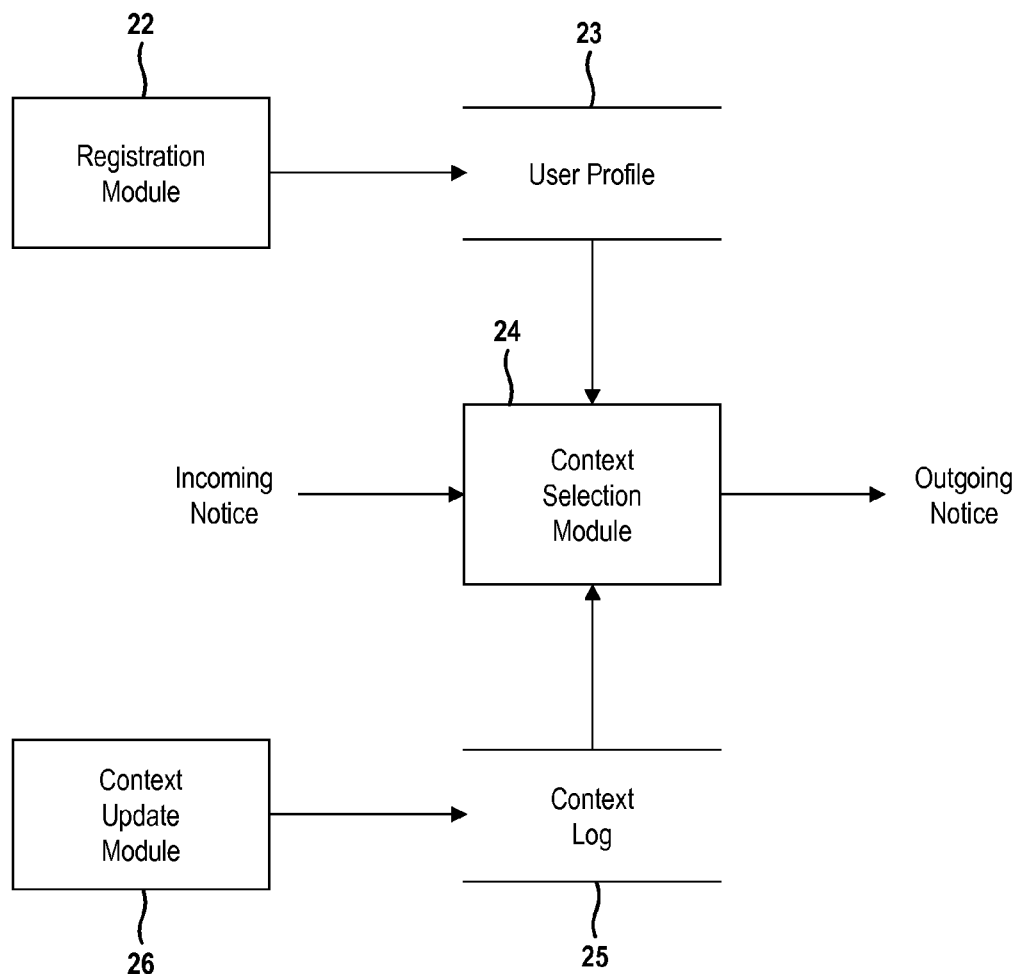
FIG. 2 is a block diagram of an example embodiment of the notification service.

FIG. 2 further depicts an example embodiment for implementing the notification service 10. The notification service 10 can be comprised generally of a registration module 22, a context selection module 24, and a context update module 26. In one embodiment, each of these modules can be implemented on a computing system located remote from the user, such as a server computer. In other embodiments, the modules may be distributed amongst one or more devices associated with the user as well as the computing system located remote from the user. Each of these modules is further described below.

The registration module 22 can enable the notification service 10 to capture the association between a user and their computing devices. In one embodiment, the registration module 22 can provide an interface for the user to establish a user profile, where the user profile includes a unique identifier for the user (e.g., user id). The registration module 22 can further enable the user to associate one or more computing devices with their user profile. An association may be maintained by linking a unique identifier (e.g., device serial number) for each computing device to the user's profile. The association between the user and their devices can be stored as part of a user profile in data store 23. The user profile may further include notification preference settings as will be further described below.

The context selection module 24 can be configured to receive incoming notifications intended for the user. In operation, the context selection module 24 can receive incoming notifications and determine to which of the user's associated devices to direct the notification. When formulating a determination, the context selection module 24 may access the user's profile as well as a context log 25, where the context log 25 provides current contextual awareness of the user's devices to the context selection module 24. Contextual awareness data indicates which device a user is likely to interact with. The context update module 26 can update the data in the context log 25. Once a determination has been made, the context selection module 24 can operate to send the notification to the identified user device.

Figure 3:
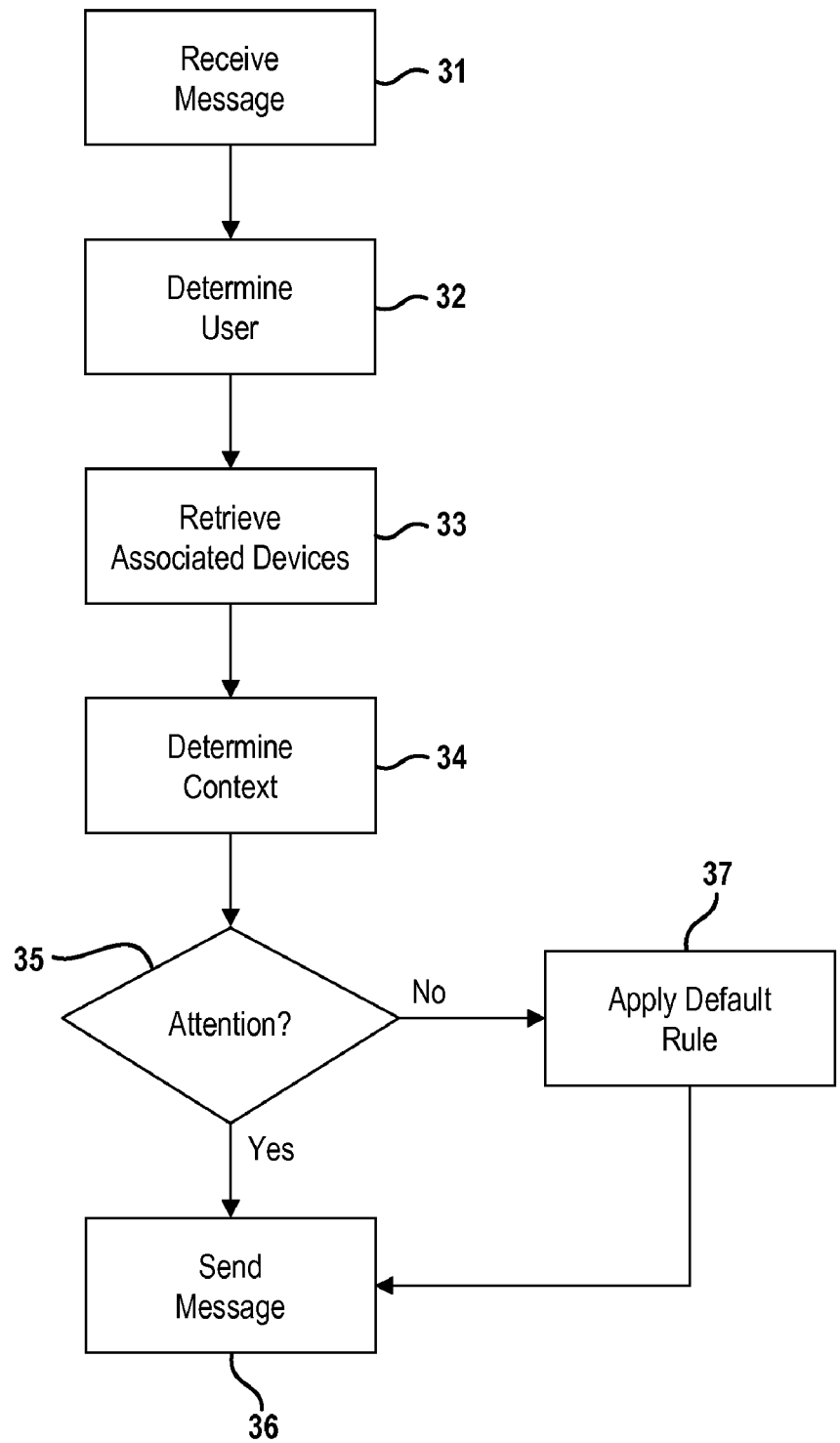
FIG. 3 is flowchart illustrating an example technique for directing notification based upon which of a user's devices has the user's attention.

One example technique for directing notification is based upon which of a user's devices has the user's attention. For instance, when the user is at home interacting with their tablet computer, notifications can be sent to the tablet computer in lieu of their other computing devices residing at this location such as a television or a video game console. In contrast, when the user is at home playing a video game, notifications intended for the user can be sent to the video game console. Process steps for implementing this technique by the context selection module 24 are further described in relation to FIG. 3.

Upon receiving an incoming notification, the notification can be parsed at 32 to determine the intended recipient. In some embodiments, the user id for the notification service can be embedded directly in the incoming notification. In other embodiments, the intended recipient of the notification can be mapped to a registered user (e.g., user id) of the notification service. For example, an intended email address for an email message can be mapped to a registered user id using a lookup table. In another example, a dialed phone number can be mapped to a registered user id. The registered user id can then be used to determine the different devices associated with the user. More specifically, a user's associated devices can be retrieved from the user's profile by the context selection module 24.

Next, the context selection module 24 can determine at 34 which, if any, of the user's associated devices has the attention of the user or is currently being interacted with by the user. To do so, the context selection module 24 can query the context log 25. The context log 25 can maintain context awareness data for registered users. In one embodiment, each entry in the context log 25 may include, for example, a user id, a device identifier, indicia of the context type and a timestamp. For example, a device receiving input from a user or experiencing some other type of interactions with the user (e.g., being held by the user) within a predetermined time period may be deemed the device having the user's attention. In this example, an entry for the device can be placed in the context log by the device with the indicia of context type set as 'user interaction'. In another example, a device hosting an application with an active user session may be deemed the device having the user's attention. In this example, an entry for the device can be placed in the context log by the device with the indicia of context type set as 'user session'. Alternatively, the notification service 10 may have visibility of other cloud computing services and thus any active sessions the user may have with a given service. In this case, the context update module 26 may create entries for the active user sessions in the context log which were learned from other services. Other techniques for determining which device has the user's attention or is being interacted with, along with corresponding indicia, are contemplated by this disclosure.

From the entries in the context log, the context selection module 24 can determine which, if any, device has the user's attention or is being interacted with by the user. In a simplified embodiment, the device having the most recent entry in the context log within a predefined time period (e.g., a few minutes) can deemed the device having the user's attention. It is envisioned that within the predefined time period there may be entries for more than one device associated with the user. In these instances, a determination can be made by the context selection module 24 from amongst the different devices having entries in the context log within the predefined time period. In one example embodiment, the device having the most recent entry is deemed the device having the user's attention. In another example, there may be a hierarchy assigned to the different context types. That is, the context type of 'user interaction' may be more indicative of a device having the user's attention than the context type of 'user session' and therefore is assigned a higher priority rank. Given multiple entries for different devices in the context log within the predefined time period, the context selection module 24 may select the device having the higher priority rank as the device having the user's attention (even if the entry for this device is not the most recent amongst the multiple entries. Other techniques for selecting from amongst multiple devices are also contemplated by this disclosure.

Once a device has been selected as having the user's attention or being interacted with by the user, notification can be sent at 36 by the content selection module 24 to the selected device. In some embodiments, the notification can be directed to an appropriate application residing on the selected device. For example, an email message can be sent to an email application and a phone call can be directed to an application that handles incoming calls. In other embodiments, the content selection module 24 may also understand which application on the selected device has the user's current attention, where the application having the user's attention differs from the application intended to receive the notification. For example, content select module may be sending an email message to an email application while the user is known to be interacting with a web browser. In this case, the content selection module may operate to send the notification or a generic desktop notification to the particular application having the user's attention (e.g., web browser).

In some instances, none of the devices are deemed to have the user's attention or being interacted with by the user (e.g., no recent entries for the user are in the context log). In these instances, the context selection module 24 may apply a default rule at 37 for handling an incoming notification. An example default rule may specify to route the notification to a particular device such as the user's mobile device. Another example default rule may specify to store the notification until a particular device has the user's attention and then route the notification the device. In this case, the context selection module 24 can periodically poll the context log for new entries. The incoming notification can then be sent by the content selection module 24 in accordance with the default rule. In this way, notifications can be sent in an automated manner having contextual awareness amongst multiple devices associated with a user.

Figure 4:
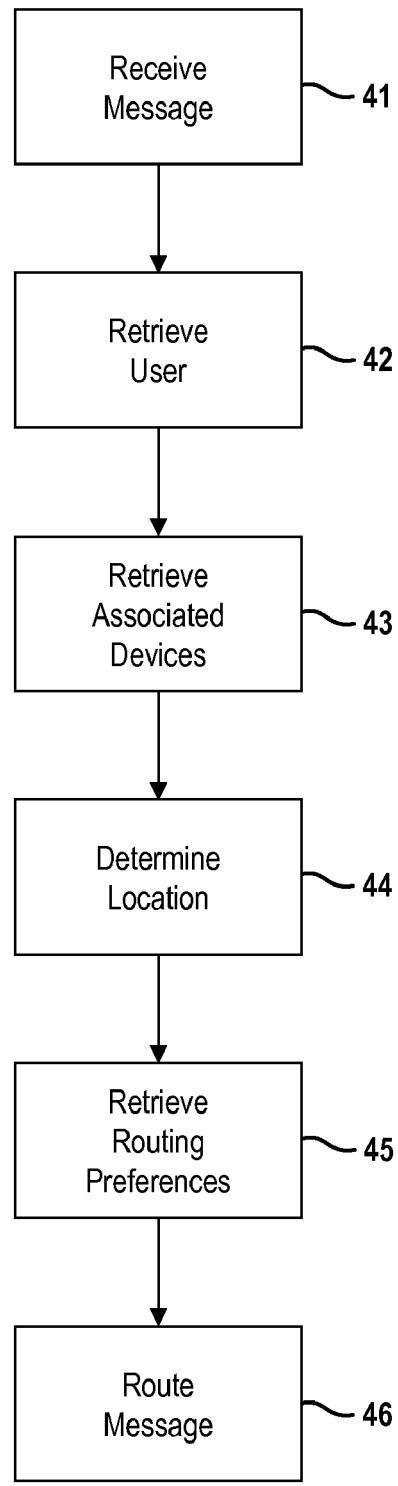
FIG. 4 is flowchart illustrating an example technique for directing notification based at least in part on a user's current location.

Another example technique for directing notification can be based upon the present location of the user. For instance, when the user is in their vehicle, notification can be sent to a user's mobile device which may be configured to interface with the vehicle or directly to a communication device integrated into the vehicle. In contrast, when the user is at a work office, notifications could be sent to a desktop computer in lieu of their mobile phone. Process steps for implementing this technique by the context selection module 24 are further described in relation to FIG. 4.

Upon receiving an incoming notification, the notification can be parsed at 42 by the context selection module 24 to determine the intended recipient. Devices associated with the intended recipient can be retrieved at 43 from the user's profile by the context selection module 24. Each of these steps can be implemented in the manner set forth above.

Next, the context selection module 24 can determine a current location for the intended recipient as indicated at 44. Determining a user's current location may be achieved in a variety of different ways. In one embodiment, the user's current location may be assumed to correspond to the current location of a user's primary mobile device, such as a mobile phone. The mobile device may be configured to log its current location in the context log periodically or whenever its location changes, such that the current location may be indicated in the log by GPS coordinates retrieved from an on-board GPS device. In another embodiment, the context selection module 24 can query the user's mobile device for its current location which in turn reports the location to the context selection module 24. In other embodiments, the context selection module 24 may infer the user's current location from the user's recent interactions with one or more of their devices. For example, if the user has recently interacted with a desktop computer at their office, the user's current location can be assumed to be their office; whereas, if the user has recently interacted with a game console residing at their home, the user's current location can be assumed to be their home. By querying the context log for a user's recent device interactions, the context selection module 24 can infer the user's current location. Other techniques for determining a user's current location also fall within the broader aspects of this disclosure.

The user's profile 23 may further specify routing preferences depending upon the user's current location. Routing preferences define how certain functions are to be handled at different device locations. For illustration purposes, the routing preferences specify a location and one or more functions as follows:

| Location | Phone calls | Work email | Personal email |
|---|---|---|---|
| office | office phone | office PC | home PC |
| car | mobile phone | mobile phone | home PC |
| home | home phone | tablet | home PC |
| default | mobile phone | mobile phone | mobile phone |

In this example, incoming phone calls can be directed to a mobile phone number when the user is traveling in their vehicle but directed to a home phone number when the user is at home. Likewise, email messages from a work account can be directed to a mobile phone when the user is traveling in their vehicle but directed to a tablet computing device when the user is at home. Routing preferences may be defined for other locations as well as other types of functions.

In some instances, the current device location may not match any of the locations specified by the usage policy. To accommodate this situation, a default preference may be defined by the user. For example, a default policy may specify that incoming calls and messages are to be directed to the user's mobile phone. This default policy can be applied by the context selection module 24 when the current device location fails to match any of the locations specified by the routing preferences in the user's profile.

Notification can then be sent by the content selection module 24 at 46 to the selected device in accordance with the present location of user and the corresponding routing preferences for the user. In some instances, there may be two or more devices at a present location. Accordingly, the context selection module 24 may be further configured to identifying a computing device that has the attention of the user or is being interacted with from amongst two or more computing devices at the present location. Determining which device the user is interacting with can be determined by the context selection module 24 from the context log in the manner described above. Once identified, the context selection module 24 can then send the notification to the device identified as having the user's attention at the current location.

As used herein, the term module may refer to, be part of, or include: an Application Specific Integrated Circuit (ASIC); an electronic circuit; a combinational logic circuit; a field programmable gate array (FPGA); a processor or a distributed network of processors (shared, dedicated, or grouped) and storage in networked clusters or datacenters that executes code or a process; other suitable components that provide the described functionality; or a combination of some or all of the above, such as in a system-on-chip. The term module may also include memory (shared, dedicated, or grouped) that stores code executed by the one or more processors.

The term code, as used above, may include software, firmware, byte-code and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The techniques described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

Some portions of the above description present the techniques described herein in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the described techniques include process steps and instructions described herein in the form of an algorithm. It should be noted that the described process steps and instructions could be embodied in software, firmware or hardware, and when embodied in software, could be downloaded to reside on and be operated from different platforms used by real time network operating systems.

The present disclosure also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a tangible computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatuses to perform the required method steps. The required structure for a variety of these systems will be apparent to those of skill in the art, along with equivalent variations. In addition, the present disclosure is not described with reference to any particular programming language. It is appreciated that a variety of programming languages may be used to implement the teachings of the present disclosure as described herein.

The present disclosure is well suited to a wide variety of computer network systems over numerous topologies. Within this field, the configuration and management of large networks comprise storage devices and computers that are communicatively coupled to dissimilar computers and storage devices over a network, such as the Internet.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A computer-implemented method for notifying a user having an association with a plurality of computing devices, comprising:
   receiving, at a server device, a notification intended for a user, the notification being further intended for a first application;
   identifying, by the server device, from the plurality of computing devices, a first computing device that is being interacted with by the user;
   identifying, by the server device, a second application that is being interacted with by the user and that is executing at the first computing device, the second application being different from the first application; and
   sending, by the server device, the notification to the second application executing at the first computing device.

2. The computer-implemented method of claim 1, wherein the identifying the first computing device is based at least in part on a recent user interaction with the first computing device, the user interaction occurring within a predefined time period.

3. The computer-implemented method of claim 1, wherein the identifying the first computing device is based at least in part on the second application executing at the first computing device, the second application being associated with an active user session between the second application and a service executing at the server device.

4. The computer-implemented method of claim 1, wherein the identifying the first computing device is based at least in part on context awareness data including at least one indication of at least one interaction by the user with one or more of the plurality of computing devices.

5. The computer-implemented method of claim 4, further comprising:
   receiving, at the server device, from one or more of the plurality of computing devices associated with the user, context awareness data for the user; and
   storing the context awareness data for the user in a context log residing at a memory device of the server device.

6. The computer-implemented method of claim 4, wherein:
   the context awareness data is included in a context log comprising multiple entries,
   the identifying is based at least in part on an entry for the first computing device included in the context log, and
   the entry is the most recent entry amongst a plurality of entries included in the context log, each entry from the plurality of entries being associated with the user.

7. The computer-implemented method of claim 4, wherein:
   the context awareness data is included in a context log comprising multiple entries,
   the identifying is based at least in part on an entry for the first computing device in the context log, and
   the entry specifies a type of user interaction having a higher priority rank than the priority rank of other entries in the context log that are associated with the user.

8. The computer-implemented method of claim 4, wherein the notification is a first notification and the first computing device is being interacted with by the user at a first time corresponding to receiving the first notification, further comprising:
   receiving, at the server device, a second notification intended for the user;
   determining, based at least in part on the context awareness data, that none of the plurality of computing devices are being interacted with by the user at a second time, the second time corresponding to receiving the second notification and being after the first time; and
   sending, by the server device, the second notification to the first computing device, the sending being performed in response to the determining that none of the plurality of computing devices are being interacted with by the user at the second time.

9. The computer-implemented method of claim 1, wherein the notification is indicative of at least one of an email message, a text message, or an incoming phone call.

10. A computer-implemented method for notifying a user having an association with a plurality of computing devices, comprising:

receiving, at the server device, a notification intended for the user, the notification being further intended for a first application;

determining, by the server device, a current location of the user, the current location corresponding to a location of a particular computing device that is being interacted with by the user;

selecting, by the server device, based at least in part on the current location of the user, a first computing device from amongst the plurality of computing devices;

determining, by the server device, a second application that is being interacted with by the user and that is executing at the first computing device, the second application being different from the first application; and sending, by the server device, the notification to the second application executing at first computing device.

11. The computer-implemented method of claim 10, further comprising:

defining, at the server device, a context log including location information for one or more of the plurality of computing devices, wherein the determining the current location of the user includes querying, by the server device, the context log.

12. The computer-implemented method of claim 10, wherein the determining the current location of the user is based at least in part on a current location of a mobile device carried by the user.

13. The computer-implemented method of claim 10, wherein the determining the current location of the user is based at least in part on a recent user interaction with one or more of the plurality of computing devices.

14. The computer-implemented method of claim 10, wherein the sending the notification is performed in accordance with a routing preference policy associated with the user.

15. The computer-implemented method of claim 10, further comprising:

determining, by the server device, from the plurality of computing devices, a subset of computing devices physically located at the current location, the first computing device being included in the subset of computing devices, wherein the first computing device is selected from the subset.

16. The computer-implemented method of claim 10, wherein the selecting the first computing device is based at least in part on a recent user interaction with one or more of the plurality of computing devices, the user interaction occurring within a predetermined time period.

17. The computer-implemented method of claim 10, wherein the first computing device is physically located at a second location different than the current location of the user.

18. A computer-implemented method for notifying a user having an association with a plurality of computing devices, comprising:

receiving, at a server device, a notification intended for the user, the notification being further intended for a first application;

determining, by the server device, a current location of the user;

determining, by the server device, from the plurality of computing devices, a subset of computing devices physically located at the current location;

identifying, by the server device, from amongst the subset of computing devices, a first computing device that is currently being interacted with by the user;

identifying, by the server device, a second application that is being interacted with by the user and that is executing at the first computing device, the second application being different from the first application; and sending, by the server device, the notification to the second application executing at the first computing device.

\* \* \* \* \*